(12) United States Patent
Hall et al.

(10) Patent No.: US 8,665,882 B2
(45) Date of Patent: Mar. 4, 2014

(54) SERIALIZED ENFORCED AUTHENTICATED CONTROLLER AREA NETWORK

(75) Inventors: Brendan Hall, Eden Prairie, MN (US); Kevin R. Driscoll, Maple Grove, MN (US)

(73) Assignee: Honeywell International Inc., Morristown, NJ (US)

(*) Notice: Subject to any disclaimer, the term of this patent is extended or adjusted under 35 U.S.C. 154(b) by 1160 days.

(21) Appl. No.: 12/609,748

(22) Filed: Oct. 30, 2009

(65) Prior Publication Data

US 2011/0103390 A1 May 5, 2011

(51) Int. Cl.
- H04L 12/28 (2006.01)
- H04L 12/56 (2011.01)
- H04L 12/40 (2006.01)

(52) U.S. Cl.
CPC ............................... H04L 12/40143 (2013.01)
USPC ..................................................... 370/395.42

(58) Field of Classification Search
None
See application file for complete search history.

(56) References Cited

U.S. PATENT DOCUMENTS

| | | | |
|---|---|---|---|
| 5,519,709 A * | 5/1996 | Albrecht et al. | ............... 370/407 |
| 5,854,454 A | 12/1998 | Upender et al. | |
| 6,363,083 B1 | 3/2002 | Spielbauer et al. | |
| 6,865,460 B2 | 3/2005 | Bray et al. | |
| 7,289,446 B2 | 10/2007 | Itoi | |
| 7,333,504 B2 | 2/2008 | Nichols | |
| 7,783,808 B2 | 8/2010 | Hall | |
| 8,122,147 B2 | 2/2012 | Driscoll et al. | |
| 2008/0070545 A1* | 3/2008 | Lim et al. | ................... 455/404.1 |
| 2008/0107029 A1* | 5/2008 | Hall et al. | ..................... 370/235 |

OTHER PUBLICATIONS

R. Bosch, Bosch Controller Area Network, Version 2.0, pp. 1-73, Sep. 1991.*
M. Barranco, G. Rodriguez-Navas, Design and implementation of CANcentrate: an active star topology for improving fault confinement in CAN networks, pp. 1-55, Technical Report A-Mar. 2005, UIB Department of Mathematical Sciences and Informatics, 2005.*
G. Cena, L. Durante, A. Valenzano, A new CAN-like field network based on a star topology, pp. 209-222, Computer Standards & Interfaces: Elsevier Publications, Mar. 9, 2001.*
P. Sathish, P. Ranjan and S. Manohar, A New Approach for Fault Confinement in CAN-Network, pp. 551-554, proceedings of IEEE ICSN 2007, Feb. 24, 2007.*
Farsi et al., "An Overview of Controller Area Network", "Computing & Control Engineering Journal", Jun. 1999, pp. 113-120.

(Continued)

*Primary Examiner* — John Blanton
*Assistant Examiner* — Christopher Crutchfield
(74) *Attorney, Agent, or Firm* — Fogg & Powers LLC (57) ABSTRACT

A system comprises a plurality of nodes; and a hub that is communicatively coupled to each of the plurality of nodes via a plurality of point-to-point links, wherein a priority-based arbitration scheme is used by the plurality of nodes and the hub to communicate over each of the plurality of point-to-point links. When the hub determines that one or more of the plurality of nodes is each transmitting a message having an identification field comprising a first sub-field and a second sub-field, the hub uses the first sub-field to select which node's message should be forwarded to the other nodes based, at least in part, on the priority-based arbitration scheme and forwards the selected node's message as it is received to the other nodes, continuing with the second sub-field of the selected node's message.

20 Claims, 7 Drawing Sheets

(56) References Cited

OTHER PUBLICATIONS

Passemard, Michel, "Atmel Microcontrollers for Controller Area Network (CAN)", "White Paper", Feb. 2004, Publisher: Atmel Corporation.

Kaiser et al., "Implementing the Real-Time Publisher/Subscriber Model on the Controller Area Network (CAN)", May, 1999, Publisher: 2nd Int'l Symposium on ObjectOriented Distributed Real-Time Computing Systems.

Tindell et al, "Analysing Real-Time Communications: Controller Area Network (CAN)", "Proceedings of Real-Time Systems Symposium, 1994.", 1994, Publisher: IEEE.

Zuberi et al, "Non-preemptive Scheduling of Messages on Controller Area Network for Real-Time Control Applications", "Proceedings of the Real-Time Technology and Applications Symposium", 1995, Publisher: IEEE.

\* cited by examiner

SERIALIZED ENFORCED AUTHENTICATED CONTROLLER AREA NETWORK

CROSS REFERENCE TO RELATED APPLICATIONS

This application is related to the following co-pending United States patent applications, each of which is hereby incorporated herein by reference:

U.S. Ser. No. 11/557,886, filed Nov. 9, 2006 entitled "METHOD FOR ACKNOWLEDGEMENT OF MESSAGES IN A STAR NETWORK", referred to herein as the "'886 Application"; and U.S. Ser. No. 11/935,360, filed Nov. 5, 2007 entitled "EMBEDDED SELF-CHECKING ASYNCHRONOUS PIPELINED ENFORCEMENT (ESCAPE)", referred to herein as the "'360 Application."

BACKGROUND

The Controller Area Network (CAN) protocol (ISO 11898) is flexible and easy to deploy in distributed embedded systems. It has been widely used in various industries. For example, the CAN protocol is a de facto network standard for automotive applications. Since initial deployments in the late 1980s the simple low-cost bus topology and inherent flexibility of CAN have enabled it to capture the majority of low- to medium-speed networking traffic. Today most automotive engine control units (ECU) have some form of connection to a CAN network, and most automotive-centric semiconductors have at least one integrated CAN controller.

Integrity and availability are two attributes of dependable communication systems. Availability is the "readiness for correct service." Integrity is the "absence of improper system state alterations." Conventional solutions are concerned about medium availability—stemming from, for example, babbling devices or shorted or broken media (partitioning of physical media)—and persistent message integrity errors stemming from bit flips and stuck-at-node faults.

However, node-induced addressing faults due to faulty hardware or software resulting in masquerading faults have not been considered in detail by conventional approaches. For example, some conventional approaches only protect the physical layer and will not cover faulty software or chips or memory affected by bit flips. Masquerading faults are particularly important for protocols that are influenced by software, since any software failure can result in persistent masquerade errors and incorrect accusation of the nodes, i.e. the wrong node is assumed to be faulty. Since these failures result in messages that are syntactically well-formed, they are especially hard to detect by diagnosis equipment monitoring a shared medium such as a bus using conventional approaches. Another failure which should be prevented is the case of a node sending an allowed frame at the wrong rate. As more safety-relevant applications emerge, the importance of covering both physical and software failure, such as masquerade faults, will increase due to the development of software-based architecture approaches.

SUMMARY

In one embodiment, a system is provided. The system comprises a plurality of nodes; and a hub that is communicatively coupled to each of the plurality of nodes via a plurality of point-to-point links, wherein a priority-based arbitration scheme is used by the plurality of nodes and the hub to communicate over each of the plurality of point-to-point links. When the hub determines that one or more of the plurality of nodes is each transmitting a message having an identification field comprising a first sub-field and a second sub-field, the hub uses the first sub-field to select which node's message should be forwarded to the other nodes based, at least in part, on the priority-based arbitration scheme and forwards the selected node's message as it is received to the other nodes, continuing with the second sub-field of the selected node's message.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary methods illustrated may include additional or fewer steps or may be performed in the context of a larger processing scheme. Furthermore, the method presented in the drawing figures or the specification is not to be construed as limiting the order in which the individual steps may be performed. The following detailed description is, therefore, not to be taken in a limiting sense.

Figure 1A:
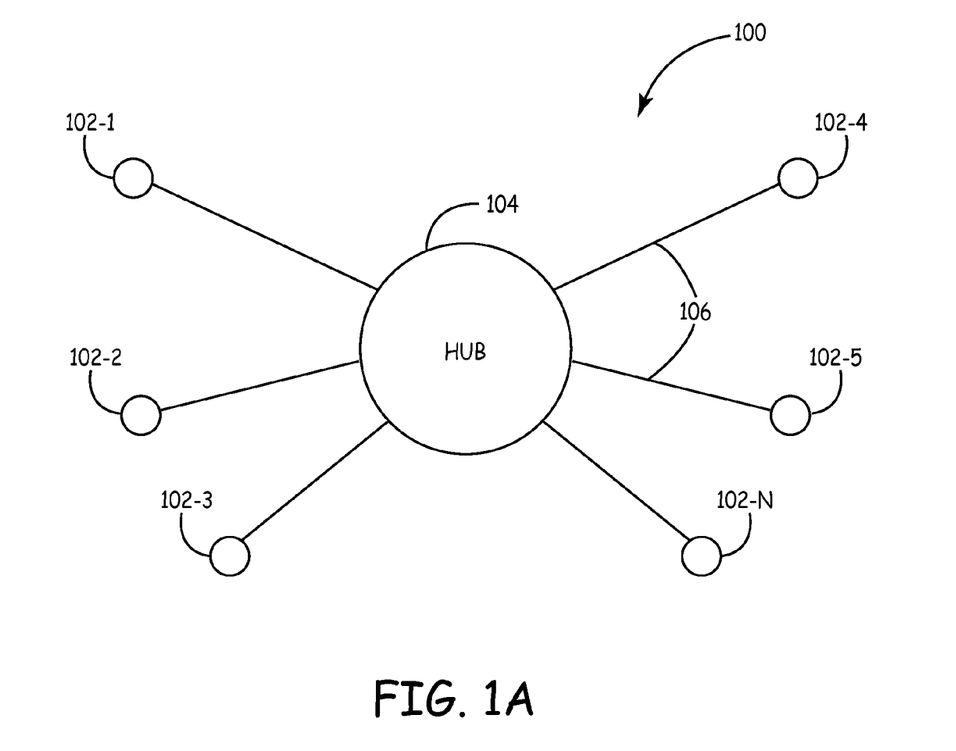
FIG. 1A is a schematic depiction of one embodiment of a network.

FIG. 1A is a schematic depiction of one embodiment of a network 100. Network 100 uses carrier sense multiple access/collision detect (CSMA/CD) with non-destructive bitwise bus arbitration to determine the priority of messages and resolve collisions. In particular, system 100 uses the Controller Area Network (CAN) protocol. It is to be understood that, although the figures are described in relation to the CAN protocol, other protocols can be used in other embodiments.

In network 100, nodes 102-1 . . . 102-N are each directly connected to a hub 104 via one of communication links 106 in a star configuration. Communication links 106 are bi-directional half-duplex point-to-point links. The point-to-point isolation of the star topology provides the required resilience to spatial proximity faults, e.g. physical media damage. Hub 104 also enables additional network policies and software fault containment to be enforced by centralized guardian action. As used herein, the term "hub" refers to a central unit coupled to each of a plurality of distributed nodes via a point-to-point communication link for each node. Similarly, the term "node" refers to an electronic device configured to perform one or more functions in a network. For example, in an automotive network, a node can include, but is not limited to, anti-lock brakes, power steering, air conditioning, power windows, engine management system, etc.

In a typical CAN system, a logical "1" is a recessive bit and a logical "0" is a dominant bit. The priority of a message, in this embodiment, is indicated by a numerical value in the message ID (MSG ID) which is a function of the software used. In particular, the MSG ID is divided into two sub-fields. One sub-field is designated as the priority sub-field and the other sub-field is designated as the message label sub-field. The priority sub-field with the lowest numerical value has the highest priority and wins arbitration in this example. However, in other embodiments, other priority schemes are used. By arbitrating on the priority sub-field, rather than the entire MSG ID field, a winner is determined prior to completing transmission of the MSG ID field.

In a typical CAN network, a recessive bit can be overwritten by a dominant bit, but not vice versa. The state of each link 106, therefore, is only recessive if both hub 104 and the respective node for each link 106 transmit a recessive bit. If either transmits a dominant bit, the dominant bit overwrites a recessive bit transmitted by the other (that is, a dominant state for the given link 106). Each of nodes 102-1 . . . 102-N monitors the link state of its associated link 106 as each node transmits.

If a node determines that it has lost arbitration during an arbitration period, the losing node ceases transmission and begins receiving the winning node's message. In this way, collisions are avoided on links 106. The bit arbitration behavior of the CAN protocol is a fault-propagation path for addressing, also called MSG ID, errors or masquerading. In a typical CAN network, any incorrect dominant bit transmitted from a faulty node early in the message identifier can influence the behavior of all non-faulty nodes due to the arbitration back-off, as discussed above. Since the protocol mandates the incremental dominant/recessive arbitration of each MSG ID bit, a typical CAN network can not contain the adverse effects of a faulty bit until it has already influenced the arbitration action.

However, in the exemplary embodiment shown in FIG. 1, each of nodes 102-1 . . . 102-N is linked to hub 104 via an independent link 106. In this exemplary embodiment, at least one of links 106, which individually couple nodes 102-1 . . . 102-N to hub 104, is implemented as an optical link. The state of each link 106 is determined by the bits transmitted by hub 104 and the respective node coupled to each link 106. Hence, hub 104 independently observes and validates the priority sub-field from each arbitrating node without interference. All clients (nodes) that connect to hub 104 do so using standard CAN hardware and protocol in standard wiring configurations. As stated above, the hub 104 arbitrates the messages using the priority sub-field of the MSG ID only. The hub 104, thus, determines a winner by the end of transmission of the priority sub-field. The hub 104, then signals to the losing nodes that they have lost arbitration and begins forwarding the message label sub-field of the winning node's message. In this way, each of the losing nodes receives the entire message label from the winning node and the guardian/arbitration action of the hub 104 is transparent to the nodes 102-1 . . . 102-N. Therefore, despite the guardian/arbitration action of the hub 104, minimal to no delay is introduced into the network communication due to the guardian/arbitration action.

The guardian/arbitration action of hub 104 is implemented by reserving the least significant bit (LSB) of the priority sub-field in the MSG ID. The LSB of the priority sub-field is used to signal the status of the fault-tolerant arbitration to the connected clients/nodes 102-1 . . . 102-N. IDs are allocated in accordance with network rules and each node 102-1 . . . 102-N is communicatively connected to hub 104. Hub 104 then uses the reserved bit and labels in performing enforcement actions. Details of the use of the reserved bit and labels by hub 104 are described below.

When one of nodes 102-1 . . . 102-N has a message to transmit, it waits for the required minimum bus idle time before commencing its transmission with the dominant Start of Frame (SOF) field. Following the SOF field, the node begins transmitting the MSG ID to initiate the arbitration sequence. During the transmission of the priority sub-field in the MSG ID, the node monitors the status of the transmit (TX) and receive (RX) signals on its corresponding link 106 to detect conflicts on the link according to the standard CAN protocol. If the node is transmitting a recessive bit of the priority sub-field but detects a dominant bit on the medium, it concludes that it has lost arbitration and ceases its transmission and switches to receiving the higher priority message in accordance with standard arbitration logic as discussed above. If the node reaches the end of the arbitration field (that is, the priority sub-field) without detecting a conflict on the corresponding link 106, it concludes that it has won the arbitration and continues to send the remaining portion of the message under transmission. During the transmission of the remainder of the message, the winning node continues to monitor the TX and RX consistency; if a conflict is detected during the transmission of the message body, the node concludes that an error has occurred and an error flag is forced to signal this status to all nodes.

When the hub 104 detects the leading edge of a SOF field on any of its inputs, it reflects the SOF to all of the connected ports. Following the SOF transmission, each of nodes 102-1 . . . 102-N, which desires to transmit a message (that is, each active arbitrating node), immediately begins transmission of its MSG ID field. As discussed above, in a typical CAN network, due to the wired AND behavior of the dominant/recessive bus, the arbitrated result is for each bit to facilitate the arbitration processes. However, in some embodiments, the direct sharing of incremental arbitration status is prevented.

Instead of reflecting the arbitrated bit-by-bit status of the multiple arbitrating node inputs following the detection of the SOF states, hub 104 observes the bits of the priority sub-field from each arbitrating node. As used herein, arbitrating nodes are nodes that are actively transmitting and arbitrating. Since only the hub 104 is observing the priority sub-field bits from all of the arbitrating nodes, it will appear to each arbitrating node that it is winning the arbitration. Thus, each arbitrating node will continue to transmit the entire priority sub-field and the hub 104 will continue to receive the priority sub-field from each of the arbitrating nodes independently of one another over the corresponding links 106.

The actual arbitration of messages is performed following the reception at hub 104 of the next-to-last bit of each arbitrating node's priority sub-field. In particular, hub 104 validates and authenticates each priority sub-field as it is received. Validation of a priority sub-field includes ensuring that the ID in the priority sub-field belongs to a set of valid IDs and doesn't violate temporal constraints. Temporal constraints relate to the frequency with which a particular ID may be sent. Thus, a valid priority sub-field is a sub-field containing an ID transmitted from a given node at the correct rate. Authentication of a priority sub-field includes ensuring that the ID is received at the correct port. Hub 104 knows which IDs may be received on each port. Thus, hub 104 is able to detect an otherwise valid priority sub-field that was sent from a masquerading node when the ID is received on an improper port. Hence, hub 104 masks faulty nodes' IDs from affecting the arbitration decision. One exemplary embodiment of logic used in hub 104 to implement the authentication and validation of priority sub-fields is described below and shown in FIG. 5.

Each of nodes 102-1 ... 102-N is configured to transmit all messages with a recessive bit in the least significant bit (LSB) of the priority sub-field. Hub 104 signals the result of the arbitration decision using the LSB of the priority sub-field. In particular, hub 104 asserts a dominant bit in the LSB on links 106 for all losing nodes. Since, each of nodes 102-1 ... 102-N is configured to transmit a recessive LSB, asserting a dominant LSB signals to the losing nodes that they have lost arbitration. Each of the losing nodes then ceases transmission and switches to receiving the forwarded message from hub 104. In particular, the hub 104 immediately begins forwarding the message label sub-field of the winning node's MSG ID. Thus, each losing node receives the complete message label with minimal to no delay from the arbitration action of the hub 104. For the winning node, hub 104 does not assert a dominant bit and simply continues receiving the winning node's message over the corresponding link 106.

In another embodiment, the last two bits of the priority subfield are reserved. The LSB is used to signal which nodes have lost arbitration, as described above. The next-to-last bit allows additional processing time for making an arbitration decision. Such embodiments allow delay in the hub's arbitration logic to be pipelined and paralleled with activity on the links 106 during the next-to-last bit of the priority subfield. On a hub that has slow logic, such embodiments allow higher-speed bus implementations than would be possible with a mechanism that must make an arbitration decision in less than one bit time.

The hub 104, therefore, is configured to arbitrate messages received from nodes 102-1 ... 102-N. Hub 104 is also a central guardian for nodes 102-1 ... 102-N. By validating and authenticating messages received from nodes 102-1 ... 102-N, hub 104 is able to isolate faulty nodes as well as mitigate network errors, such as babbling idiot and masquerade errors. In addition, hub 104 enables this protection and arbitration while minimizing delay to messages.

This configuration provides an advantage over typical systems that immediately begin forwarding a message once received at the hub. In such systems, at least a portion of a message has already been forwarded prior to validation and arbitration of messages received at the hub. For example, if a message is determined to be invalid, the forwarded part of the message cannot be refracted as it has already been sent to the other nodes. Such systems, therefore, can increase the error count at the other nodes by potentially allowing portions of invalid messages to be forwarded to all nodes and bus bandwidth is lost during the erroneous message. In the exemplary embodiments described above, however, the hub 104 validates and arbitrates the message IDs in the priority sub-field prior to forwarding the winning node's message. Thus, invalid message are contained in the hub 104. Since arbitration is performed on only the priority sub-field, the hub 104 is able to forward the message label after arbitration without introducing delay. Since each receiving node receives the entire message label, the arbitration action of the hub 104 is essentially transparent to the receiving nodes. In addition, in some embodiments, the message ID in the priority sub-field is the same as the message ID in the message label sub-field. This reduces confusion with respect to assigning and processing message IDs.

Also, as stated above, the hub 104 does not have to wait for the entire winner's message to be received prior to forwarding the message. This ability provides an advantage over systems that store the message until the entire message is received and processed. In such systems, once the entire message is received, the hub then forwards the winner's message. These systems introduce increased latency into the transmission of messages from one node to another and potentially waste bandwidth due to the message appearing twice on the network links. In the embodiment shown in FIG. 1, however, latency is reduced by forwarding the message label sub-field of the winning node's MSG ID field immediately after arbitrating the priority sub-field and bandwidth is not wasted by retransmitting the message at a later time.

In addition, in some embodiments, hub 104 is a self-checking pair in order to detect and prevent failure of hub 104. A self-checking pair provides protection against a faulty hub since each member of the self-checking pair is able to provide guardianship over the other. However, it is to be understood that other configurations can be used in hub 104 in other embodiments. For example, in another embodiment, hub 104 is a dual self-checking pair. A dual self-checking pair provides additional availability by using two self-checking pairs, with one pair being an active spare for the other. Alternatively, a single member or a triplex member configuration with three members in hub 104 can be used. In a triplex configuration, each of nodes 102-1 ... 102-N determines if a member of hub 104 is faulty by comparing data received from each of the three members of the triplex hub configuration. In other embodiments, other hub configurations can be used which also ensure that hub 104 fails passive.

In typical CAN networks, bit stuffing is performed throughout the entire transmission. That is, when a node has transmitted a sequence of five identical bits, it inserts an opposing bit to ensure that the link layer retains sufficient edges to maintain suitable synchronization. However, in some embodiments of network 100, the priority IDs that require bit stuffing are not used; therefore, bit stuffing is only performed for the message label sub-field, payload and cyclic redundancy check (CRC) fields. Avoiding bit stuffing within the priority sub-field of nodes 102-1 ... 102-N keeps all sending nodes time-aligned, (that is, at the same bit number) such that they will end the priority ID at the same point in time. This situation allows hub 104 to send the dominant LSB of the priority ID to losing nodes at the same point in time and to forward the remainder of the winner's message without requiring time adjustments. Since priority sub-field bit stuffing is removed for nodes 102-1 ... 102-N, if hub 104 detects six identical bits following the SOF it can deduce that either the connected node is idle (that is, receiving and not transmitting, if six recessive bits are detected), or that the connected node is erroneous if six dominant bits are detected. However, for active arbitrating nodes, hub 104 is guaranteed to detect at least one dominant bit and at least one recessive bit during the first six bits of the priority sub-field.

However, in some embodiments, bit stuffing in the priority sub-field is not prevented. In such embodiments, other means are used to ensure that the priority IDs are aligned. For example, in one embodiment, one or more bits at the end of the MSG ID are reserved as an extended signaling mechanism. The number of bits reserved at the end of the MSG ID field is dependent on the number of bits used for bit stuffing. For example, if the MSG ID field is 11 bits in length, the maximum number of bits which will be inserted for bit stuffing is two bits. This is because a bit is inserted after 5 consecutive bits of the same value. Therefore, two bits are reserved at the end of the MSG ID field in such embodiments.

In addition, the hub 104 recalculates the CRC field for the message forwarded to each node 102. In particular, each node 102 observed a different priority sub-field on the respective communication link 106 during the arbitration period. Therefore, the hub 104 recalculates the CRC in each forwarded message based on the priority sub-field observed by the corresponding node 102. In other words, each message forwarded to a corresponding node 102 may have a unique CRC.

Additionally, since the CRC is recalculated for the message forwarded to each node 102, it may be necessary to perform bit-stuffing in the recalculated CRC field. If bit-stuffing is used, the message forwarded to one node 102 may be longer than the message forwarded to another node 102. For example, the CRC of one forwarded message may contain 1 or 2 additional bits that are not sent in another forwarded message due to the different CRC fields. In some embodiments, in order to ensure that the nodes with a shorter CRC field do not have a leading start on the next arbitration period, hub 104 inserts overload frames on the corresponding links 106 to hold off the nodes with the shorter CRC field. The overload frames sent to nodes with the shorter CRC fields will be longer than the overload frames sent to nodes with longer CRC fields in order to more closely align the beginning of the inter-message bus idle period as seen by all nodes. In other words, the nodes with the shorter CRC fields are prevented from re-arbitrating until forwarding of the message to the other nodes with longer CRC fields has completed. The length of the overload delay is calculated to align nodes 102-1 . . . 102-N to start the next arbitration sequence simultaneously. For example, if the CRC field sent to a first node is 1 bit longer than the CRC field sent to a second node, the overload frame inserted on a link 106 coupled to the second node is one bit longer than the overload frame inserted on a link 106 coupled to the first node.

Figure 1B:
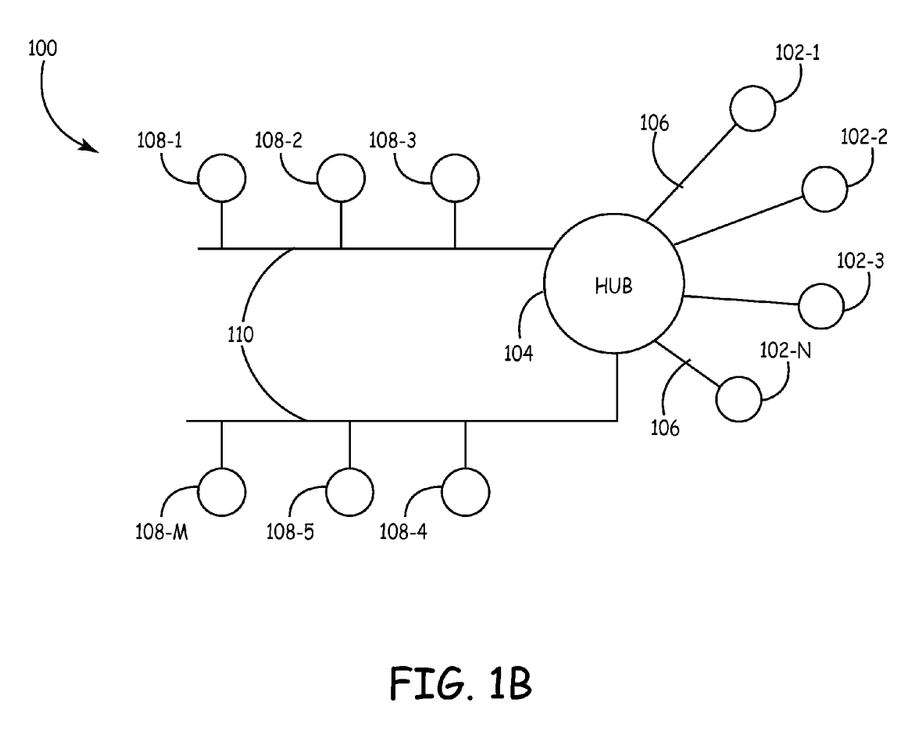
FIG. 1B is a schematic depiction of another embodiment of a network.

FIG. 1B is a schematic depiction of another embodiment of network 100. Network 100 in FIG. 1B includes hub 104, safety-related nodes 102-1 . . . 102-N and non-safety-related nodes 108-1 . . . 108-M. Safety-related nodes 102-1 . . . 102-N are communicatively coupled to hub 104 via independent links 106. Hub 104 arbitrates and validates messages from safety-related nodes 102-1 . . . 102-N as described above. However, non-safety-related nodes 108-1 . . . 108-M are communicatively coupled to hub 104 via one or more simple shared bus segments 110 as in a typical CAN network. Accordingly, message arbitration between non-safety-related nodes 108-1 . . . 108-M is accomplished as in a typical CAN network. Hence, network 100, as illustrated in FIG. 1B, permits the mapping and intermixing of simple bus segments that do not have safety concerns with safety related nodes in the same network 100. Additionally, in some embodiments, at least one of links 106 which individually couple nodes 102-1 . . . 102-N to hub 104 is an optical link.

Hub 104 includes or interfaces with hardware components that support the transmission and reception of network communications. By way of example and not by way of limitation, these hardware components include one or more microprocessors, graphics processors, memories, storage devices, interface cards, and other standard components known in the art. Additionally, in some embodiments, hub 104 includes or functions with software programs, firmware or other computer readable instructions for carrying out various methods, process tasks, calculations, and control functions, used in the operation of a network, such as method 400 described below.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Figure 2:
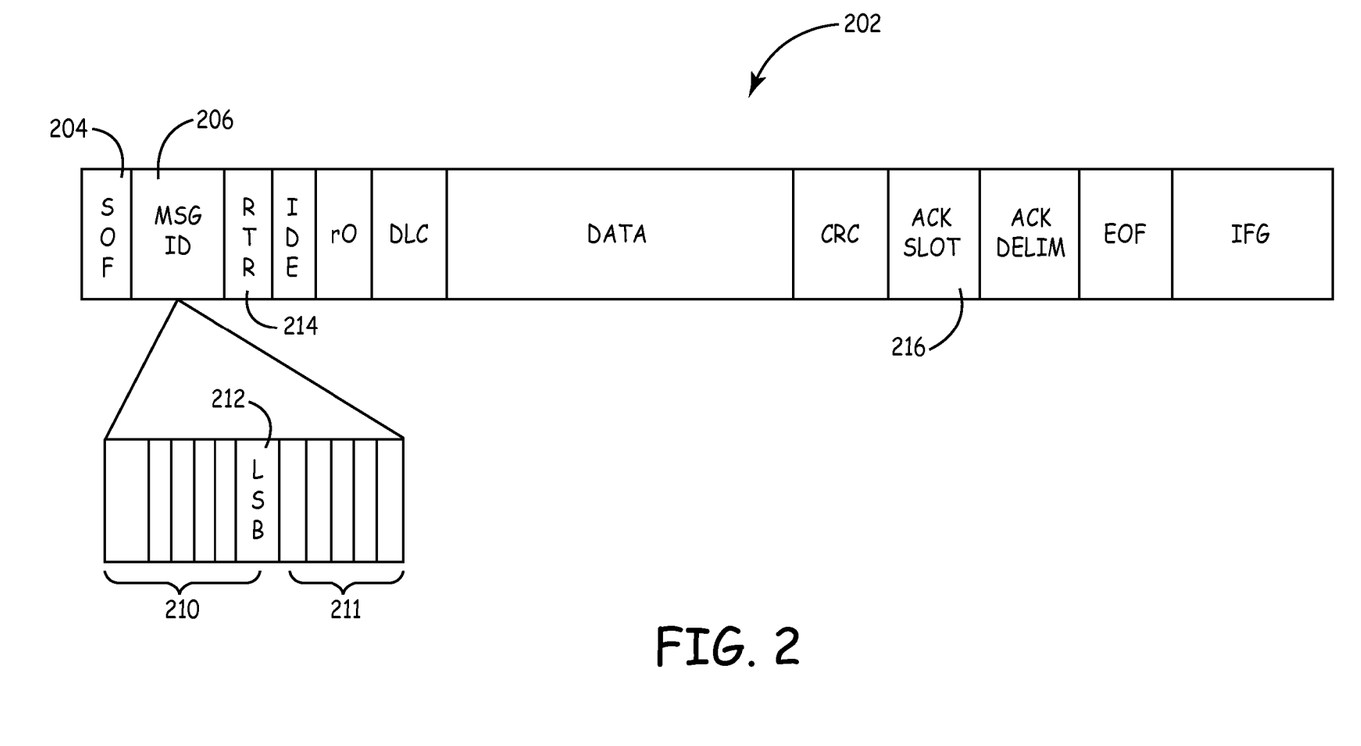
FIG. 2 depicts an exemplary data frame.
Figure 3:
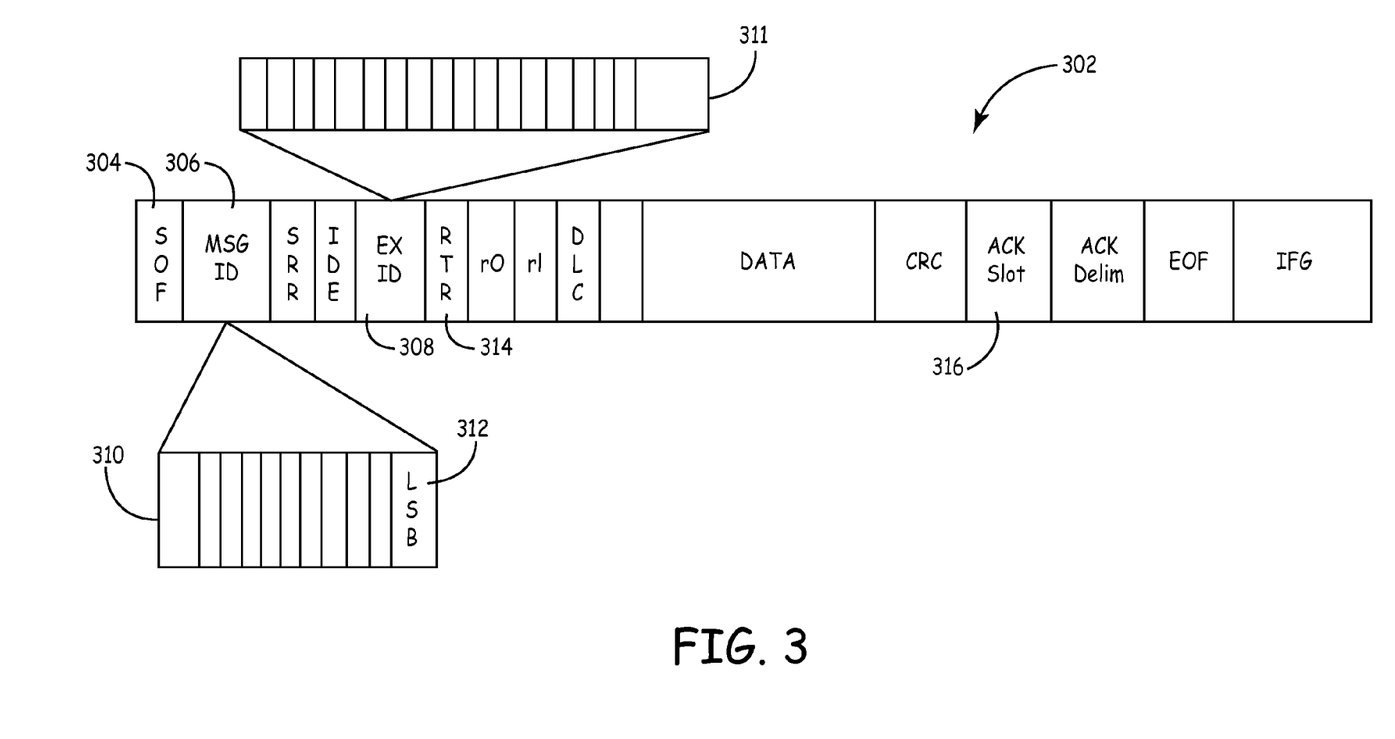
FIG. 3 depicts another exemplary data frame.

Exemplary message frame formats are shown in FIGS. 2 and 3. In particular, frames 202 and 302 are configured to be used with the CAN protocol. In the embodiment of FIG. 2, message ID field 206 (also referred to as the base identifier) of frame 202 contains 11 bits (as described in CAN Specification 2.0 part A). The 11 bit message ID field 206 is divided into two sub-fields 210 and 211. In this embodiment, the first sub-field 210 is the priority sub-field. The second sub-field 211 is the message label field. The LSB 212 in priority sub-field 210 is a recessive bit in all messages sent from nodes 102-1 . . . 102-N.

In the embodiment of FIG. 3, an extended message ID is used in frame 302. In particular, the extended message ID contains 29 bits comprised of the 11-bit base identifier 306 and an additional 18-bit extension field 308 following an Identifier Extension (IDE) bit which indicates that an extended message ID is being used (as described in CAN Specification 2.0 part B). In the example shown in FIG. 3, the base identifier 306 is designated as the priority sub-field 310 and the extension field 308 is designated as the message label sub-field 311. As with priority sub-field 210, LSB 312 in priority sub-field 310 is a recessive bit in all messages sent from nodes 102-1 . . . 102-N. In other embodiments, the number of bits in the priority sub-field and the number of bits in the message label sub-field may be assigned without regard to the bits being part of the base identifier 306 or the extension field 308.

Furthermore, in some embodiments, network 100 is configured to use both 11-bit and 29-bit message ID frames. In some such embodiments, additional bits are reserved. For example, in order for hub 104 to transparently handle both 11- and 29-bit message ID frames, hub 104 is configured to identify the frame version (11- or 29-bits) before receiving the LSB 212, 312 of the priority sub-field 210, 310. In one exemplary embodiment, the frame version is identified by reserving an additional bit (pseudo-IDE bit) between the first bit of the base identifier 206, 306 and the LSB 212, 312 of the priority sub-field 210, 310. The pseudo-IDE bit is used similar to the IDE bit in conventional CAN networks. In particular, in one such embodiment, all 29-bit message ID frames are assigned a recessive pseudo-IDE bit while all 11-bit message ID frames are assigned a dominant pseudo-IDE bit. In other embodiments, the pseudo-IDE bit is not used in hybrid networks (e.g. networks using both 11- and 29-bit message ID frames). In some such embodiments, the MSG IDs of all 11-bit and 29-bit frames are assigned such that the priority sub-field 210 of all 11-bit message ID frames has a higher priority than the priority sub-field 310 of all 29-bit message ID frames. Thus, hub 104 is able to identify the frame version of each MSG ID in a hybrid network.

Figure 5:
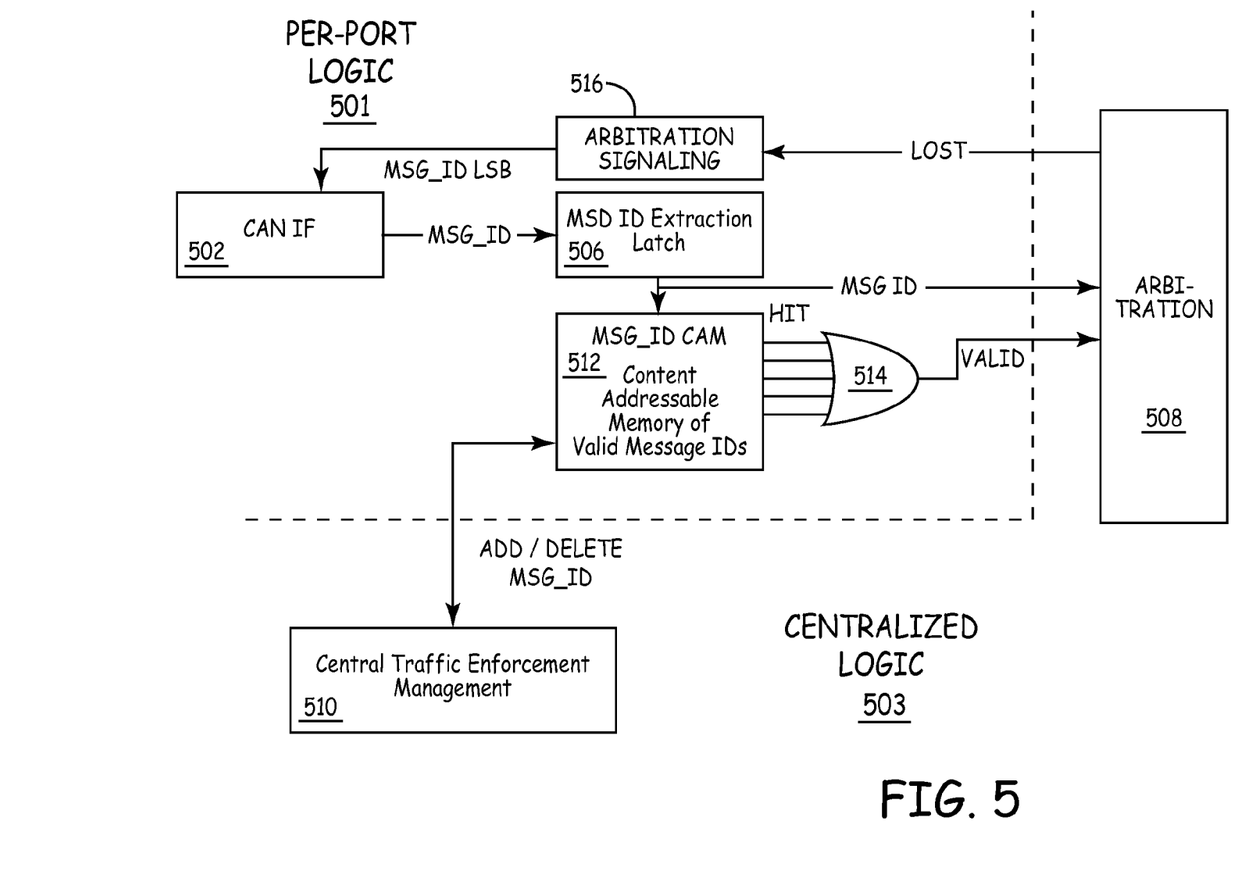
FIG. 5 is a block diagram of one embodiment of a hub.

FIG. 5 is a block diagram depicting logic used in a hub such as hub 104. Per-port logic 501 is replicated in each port of the hub whereas centralized logic 503 is used for all the ports in the hub. The centralized logic 503 includes arbitration logic 508 and traffic enforcement management logic 510. Notably, central arbitration logic 508 can be implemented in various manners including with, but not limited to, field programmable gate arrays (FPGA), application specific integrated circuits (ASIC), or one or more central processing units. In addition, the processing functions of the hub can be implemented using software, firmware, hardware, or any appropriate combination thereof, as known to one of skill in the art.

The per-port logic 501 includes CAN interface 502, MSG ID extraction latch 506, MSG ID content addressable memory (CAM) 512, OR-gate 514, and arbitration signaling logic 516. The CAN interface 502 includes a transmitter and receiver (not shown) coupled to a node such as nodes 102-1 . . . 102-N. The MSG ID extraction latch 506 extracts the priority sub-field from a message as the message is received. The extracted priority sub-field is provided to MSG ID CAM 512 which contains a list of all the valid IDs available for the port. The MSG ID CAM 512 in each port contains a unique list of IDs in this example. The unique list is used to authenticate the ID in the priority sub-field. In other words, an otherwise valid ID in the priority sub-field is only authenticated if it is received at the correct port which has the unique list of IDs containing the received ID.

The received ID is validated by performing a bit-by-bit comparison of the ID received in the priority sub-field with the list of valid IDs in MSG ID CAM 512. The MSG ID CAM 512 sends a Hit signal to OR-gate 514 for any match between the ID received in the priority sub-field and a valid ID in its list. The OR-gate 514 outputs the result of the comparison to arbitration logic 508 to indicate whether or not the received ID is valid. Thus, MSG ID CAM 512 and OR-gate 514 mask invalid and/or unauthenticated IDs from affecting arbitration in central arbitration logic 508.

Central arbitration logic 508 receives validated IDs and determines which message to forward based on the priority of each validated ID as described above. Once arbitration logic 508 has selected the message to forward, it signals loss of arbitration to the losing nodes via arbitration signaling logic 516 in each of the ports coupled to the losing nodes. In particular, arbitration signaling logic 516 asserts a dominant bit in the least significant bit of the priority sub-field in the MSG ID field. The losing nodes then cease transmitting and begin receiving the winning message that is forwarded from the hub.

Traffic enforcement management logic 510 is used to enforce high order system policies, such as transmit rate for each node, to prevent a particular node from transmitting too frequently. In particular, once a valid and authenticated ID is received, traffic enforcement management logic 510 deletes the ID from the MSG ID CAM 512 for that port. After a pre-determined time has elapsed, traffic enforcement management logic 510 adds the ID back into MSG ID CAM 512. If the same ID is received during the pre-determined time, the ID will be rejected as invalid. Thus, a node is unable to exceed rate constraints on IDs. In addition, in some embodiments, the traffic enforcement management logic 510 writes all of the valid IDs to the MSG ID CAM 512 for each port when the hub is powered on. In some embodiments, the deletion of an ID is done logically by setting an "invalid" flag rather than actually removing the ID from the MSG ID CAM 512.

Figure 4A:
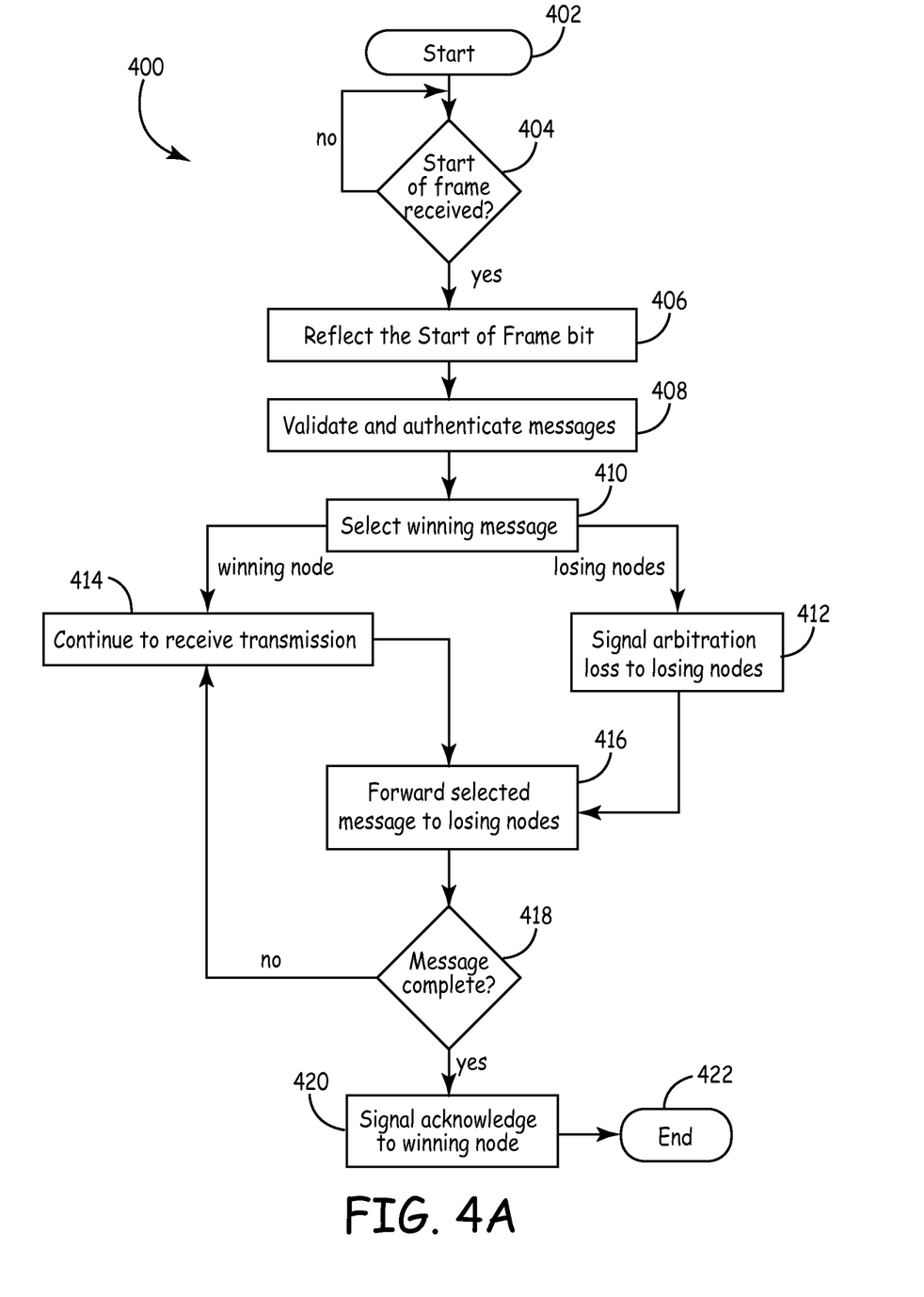
FIG. 4A is a flow chart depicting one embodiment of a method of communicating in a network.

FIG. 4A is a flow chart depicting one embodiment of a method 400 of communicating in a network. Method 400 is implemented in a hub in a network such as hub 104 in network 100. Method 400 begins at block 402. At block 404, a hub (e.g. hub 104) waits for a start of frame (SOF) bit to be received. Once a first edge of an SOF frame bit is received at the hub on any port, the hub reflects the SOF bit to each of a plurality of nodes (e.g. nodes 102-1 . . . 102-N) to start an arbitration period at block 406. Reflection of the SOF bit aligns each of the plurality of nodes for an arbitration period. During the arbitration period, each of the plurality of nodes which desires to transmit begins sending its message priority sub-field of the MSG ID field to the hub. Since only the hub is observing the priority sub-field from each arbitrating node, each arbitrating node will believe it is winning arbitration and continue transmitting its respective priority sub-field to the hub. At 408, the hub analyzes the priority sub-field from each node as it is received to validate and/or authenticate the messages. In particular, the hub completes the validation and/or authentication by the next to last bit of the priority sub-field.

The hub selects which message to forward from the validated and/or authenticated messages at block 410. The selection is based, at least in part, on the priority of each message. If an invalid ID is received in a priority sub-field, the hub blocks that respective message. The hub then selects the highest priority message of the messages which have not been blocked. In addition, in some embodiments, the selection is based on other system policies in addition to the priority of the message. In this way, the hub acts as a guardian for the nodes coupled to the hub. The hub can physically isolate faulty nodes and mitigate errors such as babbling idiot and masquerade errors.

At block 412, the hub signals to the losing nodes that they have lost arbitration. In particular, the hub asserts a dominant bit in the last bit of the priority sub-field, such as LSB 212, that is transmitted to the nodes that lost arbitration. Since each node is configured to have a recessive bit in the LSB of the priority sub-field, assertion of the dominant bit by the hub causes the losing nodes to cease transmission using standard CAN procedures. In addition, the hub allows the node which is transmitting the selected message to win arbitration by not asserting a dominant LSB to the winning node so that the winning node continues to transmit its message, at block 414. The hub begins forwarding the selected winner's message label sub-field of the MSG ID field to the losing nodes, at block 416, as the selected message is received. In particular, at block 418, the hub determines if the message transmission is complete. If the message transmission is not complete, method 400 returns to block 414 where the message continues to be received and then forwarded at block 416. In addition, forwarding the message (at block 416), includes recalculating the CRC for each forwarded message, as described above. Furthermore, in some embodiments, forwarding the message (at block 416), includes transmitting an overload frame in order to align the nodes when needed due to different length recalculated CRC fields, as described above.

Following the completion of the winning node's transmission via the hub, at block 418, the hub signals acknowledgement of the message to the winning node at block 420. For example, in this embodiment, the hub asserts a dominant bit in the ACK field of the acknowledgment field (e.g. ACK field 216 in FIG. 2 and ACK field 316 in FIG. 3). Method 400 then ends at block 422.

Figure 4B:
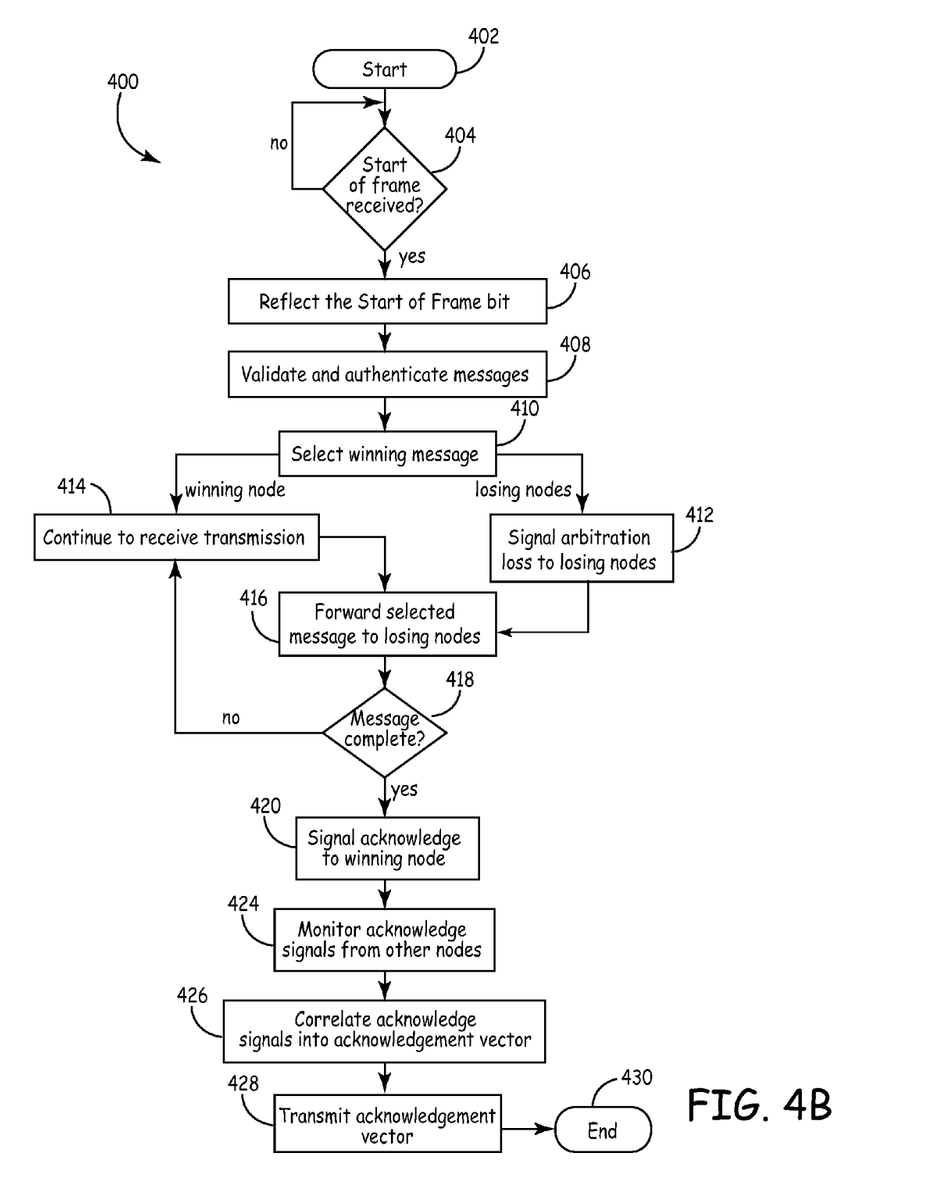
FIG. 4B is a flow chart depicting another embodiment of a method of communicating in a network.

FIG. 4B is a block diagram of another embodiment of the method 400 of communicating in a network. The exemplary method shown in FIG. 4B is similar to the exemplary method of FIG. 4A. However, the method shown in FIG. 4B includes optional blocks for acknowledging receipt of the winner's message by the losing nodes. In particular, at block 424, the hub monitors acknowledgment signals from the losing nodes that successfully received the forwarded winner's message. The losing nodes acknowledge receipt of the winner's message by asserting a dominant bit in the ACK field of the acknowledgment field in this embodiment. Since the hub is coupled to only one of the nodes on each link (as shown in FIG. 1), the hub knows which nodes have acknowledged correct receipt of the winner's message. In contrast, a node in systems using a bus does not know exactly which nodes have asserted the dominant bit in the ACK field.

At block 426, the hub correlates the acknowledgment bits into an acknowledgment vector to identify which nodes successfully received the winner's message. At block 428, the hub transmits the acknowledgment vector in a message with elevated priority to at least the winning node. For example, the hub can assert a dominant bit in the LSB of the priority sub-field for all arbitrating nodes so that the hub wins the arbitration. The hub then transmits a message label sub-field for the message containing the acknowledgment vector. In particular, in some embodiments, the hub transmits the acknowledgment vector in a message to all of the nodes. Also, in this embodiment, the hub transmits the acknowledgment vector in a message immediately following the transmission of the winning node's message. Notably, although the hub is configured to transmit the acknowledgment vector frame immediately following the winner's forwarded message in this example, other embodiments can be implemented in other ways. For example, in other embodiments, the hub transmits the acknowledgment vector frame at a later point in time rather than immediately following the forwarded message. In such embodiments, the acknowledgement vector frame includes information that associates that acknowledgement vector frame with the corresponding winner's forwarded message. In other embodiments, acknowledgment vectors from several messages can be combined into a single acknowledgment frame. This combination can retain all of the individual vectors or can combine the vectors into a form of membership information. Further details regarding the acknowledgment vector are discussed in the co-pending U.S. patent application Ser. No. 11/557,886, the '525 application. Method 400 then ends at 430.

Although specific embodiments have been illustrated and described herein, it will be appreciated by those of ordinary skill in the art that any arrangement, which is calculated to achieve the same purpose, may be substituted for the specific embodiments shown. For example, in other embodiments, more than one LSB is reserved for identifying loss of arbitration to account for bit stuffing. This application is intended to cover any adaptations or variations of the embodiments described above. Therefore, it is manifestly intended that this invention be limited only by the claims and the equivalents thereof.

What is claimed is:

1. A system comprising:
a plurality of nodes; and
a hub that is communicatively coupled to each of the plurality of nodes via a plurality of point-to-point links, wherein a priority-based arbitration scheme is used by the plurality of nodes and the hub to communicate over each of the plurality of point-to-point links;
wherein when the hub determines that one or more of the plurality of nodes is each transmitting a message having an identification field comprising a first sub-field and a second sub-field, the hub uses the first sub-field to select which node's message should be forwarded to the other nodes based, at least in part, on the priority-based arbitration scheme and forwards the remainder of the selected node's message as it is being received to the other nodes, continuing with the second sub-field of the selected node's message; wherein the second sub-field comprises a complete message label.

2. The system of claim 1, wherein each of the other nodes acknowledges to the hub the successful receipt of a predetermined portion of the forwarded message by signaling one or more dominant bits on each of the other nodes' respective point-to-point link within an acknowledgment field included within the forwarded message;
wherein the hub assembles an acknowledgment vector message that indicates which nodes have acknowledged receipt of the forwarded message and transmits the acknowledgment vector message to at least the selected node.

3. The system of claim 1, wherein the hub is configured to perform at least one of validation and authentication of the first sub-field of each message as it is received.

4. The system of claim 1, wherein the hub is comprised of a self-checking pair, a dual self-checking pair, a single member, or a triplex member hub.

5. The system of claim 1, wherein the priority-based arbitration scheme is a bit-for-bit arbitration scheme.

6. The system of claim 5, wherein the priority-based arbitration scheme is a Controller Area Network (CAN) arbitration scheme, wherein the identification field is the message identification field of a CAN frame;
wherein the least significant bit of the first sub-field in each message transmitted from each of the plurality of nodes is set to a recessive bit, wherein the hub signals which nodes have lost arbitration by signaling a dominant bit in the least significant bit of the first sub-field on each of the losing nodes respective point-to-point link.

7. The system of claim 6, wherein the message identification field comprises a base identifier field and an extension field.

8. The system of claim 7, wherein the base identifier is the first sub-field and the extension field is the second sub-field.

9. The system of claim 1, wherein the value of the first sub-field in each message is equal to the value of the second sub-field in the respective message.

10. The system of claim 1, wherein the hub is communicatively coupled to at least one of the plurality of nodes via an optical communication link.

11. The system of claim 1, further comprising:
at least one shared medium; and
a plurality of second nodes; wherein the plurality of second nodes is coupled to the hub via the at least one shared medium.

12. The system of claim 1, wherein the hub is configured to recalculate a respective cyclic redundancy check (CRC) field for the selected node's message forwarded to each respective node based on the respective first sub-field observed by each respective node.

13. A hub, comprising:
a plurality of ports to communicatively couple the hub to a plurality of bi-directional point-to-point links;
wherein the hub receives messages over the plurality of ports, each message having an identification field comprising a first sub-field and a second sub-field;
wherein the hub uses the first sub-field in each received message to select which message to forward based, at least in part, on a priority-based arbitration scheme and forwards the remainder of the selected message as it is being received to the other nodes, continuing with the second sub-field of the selected node's message;
wherein the second sub-field comprises a complete message label.

14. The hub of claim 13, wherein the hub is configured to perform at least one of validation and authentication of the first sub-field of each message as it is received.

15. The hub of claim 13, wherein the priority-based arbitration scheme is a Controller Area Network (CAN) arbitration scheme, wherein the least significant bit of the first sub-field in each message transmitted from each of the plurality of nodes is set to a recessive bit, wherein the hub is configured to signal which nodes have lost arbitration by signaling a dominant bit in the least significant bit of the first sub-field on each of the losing nodes respective point-to-point link.

16. The hub of claim 13, wherein each of the other nodes acknowledges to the hub the successful receipt of a predetermined portion of the forwarded message by signaling one or more dominant bits on each of the other nodes' respective point-to-point link within an acknowledgment field included within the forwarded message;
  wherein the hub is configured to assemble an acknowledgment vector message that indicates which nodes have acknowledged receipt of the forwarded message and transmits the acknowledgment vector message to at least the selected node.

17. A method comprising:
  receiving, at a hub, a message from each of a plurality of nodes over a plurality of point-to-point links, each message having an identification field comprising a first sub-field and a second sub-field;
  selecting which node's message to forward from the hub based on the first sub-field;
  signaling which nodes lost arbitration prior to receiving the second sub-field; and
  forwarding the selected node's message, as it is being received, to each of the losing nodes, starting with the second sub-field of the selected node's message;
  wherein the second sub-field comprises a complete message label.

18. The method of claim 17, wherein signaling which nodes lost arbitration comprises signaling a dominant bit in the least significant bit of the first sub-field.

19. The method of claim 17, wherein receiving the plurality of messages includes validating and authenticating each of the plurality of messages received;
  wherein the hub selects which message to forward from the validated and authenticated messages.

20. The method of claim 17, further comprising:
  collecting, at the hub, an acknowledgment bit from each of the losing nodes which successfully received the forwarded message into an acknowledgment vector; and
  transmitting the acknowledgment vector in a message from the hub to at least the winning node.

* * * * *